(12) United States Patent
Moden et al.

(10) Patent No.: US 11,103,947 B2
(45) Date of Patent: Aug. 31, 2021

(54) METHOD OF MAKING A STEEL YANKEE CYLINDER

(71) Applicant: Valmet Aktiebolag, Sundsvall (SE)

(72) Inventors: Stefan Moden, Kil (SE); Magnus Hoegman, Kil (SE); Andreas Hjaertqvist, Karlstad (SE)

(73) Assignee: VALMET AKTIEBOLAG, Sundsvall (SE)

( * ) Notice: Subject to any disclaimer, the term of this patent is extended or adjusted under 35 U.S.C. 154(b) by 256 days.

(21) Appl. No.: 15/021,803

(22) PCT Filed: Oct. 29, 2014

(86) PCT No.: PCT/SE2014/051278
§ 371 (c)(1),
(2) Date: Mar. 14, 2016

(87) PCT Pub. No.: WO2015/076718
PCT Pub. Date: May 28, 2015

(65) Prior Publication Data
US 2016/0228969 A1  Aug. 11, 2016

(30) Foreign Application Priority Data
Nov. 19, 2013  (SE) .................................... 1351368-4

(51) Int. Cl.
*B23K 9/02*  (2006.01)
*B23K 9/035*  (2006.01)
(Continued)

(52) U.S. Cl.
CPC ............ *B23K 9/0213* (2013.01); *B23K 9/007* (2013.01); *B23K 9/035* (2013.01); *B23K 9/16* (2013.01);
(Continued)

(58) Field of Classification Search
CPC ........ B23K 9/0213; B23K 9/007; B23K 9/16; B23K 33/00
(Continued)

(56) References Cited

U.S. PATENT DOCUMENTS 3,153,719 A * 10/1964  Arikawa .............. B23K 35/362
                                                                219/146.52
3,365,566 A    1/1968  Kuder
(Continued)

FOREIGN PATENT DOCUMENTS

CN         1958214 A       5/2007
CN      20309112 U   *    7/2013
(Continued)

OTHER PUBLICATIONS

State Intellectual Property Office of the P.R.C., First Office Action, including Search Report, for Application No. 201480053846.X, dated Oct. 19, 2016, 15 pages, China.
(Continued)

*Primary Examiner* — Thien S Tran
(74) *Attorney, Agent, or Firm* — Alston & Bird LLP

(57) ABSTRACT

The invention relates to a method of making a steel Yankee cylinder 1 by welding a cylindrical shell 2 to two end walls 3, 4 such that the cylindrical shell 2 and the end walls 3,4 together form the Yankee cylinder 1. The welding operation is carried out exclusively from the outside of the Yankee cylinder 1 and in the welding operation is carried out as a butt welding operation in which a backing material 7 is used on the inside of the Yankee cylinder 1 such that, between each end wall 3, 4 and the cylindrical shell 1, a single weld bead 8 is formed which extends all the way between the opposing surfaces 5, 6 and completely fuses the opposing surfaces 5, 6 of each end wall 3, 4 and the cylindrical shell 2 respectively.

12 Claims, 4 Drawing Sheets

(51) Int. Cl.
*B23K 9/16* (2006.01)
*D21F 5/02* (2006.01)
*B23K 33/00* (2006.01)
*B23K 9/18* (2006.01)
*B23K 9/007* (2006.01)
*B23K 103/04* (2006.01)

(52) U.S. Cl.
CPC .............. *B23K 9/18* (2013.01); *B23K 33/006* (2013.01); *D21F 5/021* (2013.01); *B23K 2103/04* (2018.08)

(58) Field of Classification Search
USPC .................................. 219/61, 73, 73.21, 469
See application file for complete search history.

(56) References Cited

U.S. PATENT DOCUMENTS

| | | | |
|---|---|---|---|
| 3,688,967 | A | 9/1972 | Arikawa et al. |
| 4,320,582 | A | 3/1982 | Klippstein et al. |
| 2008/0011812 | A1 | 1/2008 | Grycko et al. |
| 2010/0132903 | A1 | 6/2010 | Mennucci et al. |
| 2012/0168106 | A1* | 7/2012 | Mennucci ............... D21F 5/021 162/357 |
| 2014/0026418 | A1* | 1/2014 | Krasser ................... D21F 5/021 29/890.054 |

FOREIGN PATENT DOCUMENTS

| | | | | |
|---|---|---|---|---|
| CN | 203091112 | U | 7/2013 | |
| DE | 2707923 | A1 | 8/1978 | |
| EP | 1782913 | A2 | 5/2007 | |
| JP | S 60-166170 | A | 8/1985 | |
| WO | WO 2008/105005 | A1 | 9/2008 | |
| WO | WO 2012126602 | A1 * | 9/2012 | .............. D21F 5/021 |
| WO | WO 2013/117975 | * | 2/2013 | |

OTHER PUBLICATIONS

International Searching Authority, International Search Report and Written Opinion for PCT/SE2014/051278, dated Mar. 4, 2015, 10 pages, Swedish Patent and Registration Office, Sweden.
Communication Pursuant to Article 94(3) EPC for European Patent Application No. 14864648.2, dated Jul. 8, 2020, (8 pages), European Patent Office, Munich, Germany.

* cited by examiner

METHOD OF MAKING A STEEL YANKEE CYLINDER

CROSS REFERENCE TO RELATED APPLICATIONS

This application is a National Stage Application, filed under 35 U.S.C. § 371, of International Application No. PCT/SE2014/051278, filed Oct. 29, 2014, which claims priority to Swedish Application No. 1351368-4, filed Nov. 19, 2013, the contents of both of which as are hereby incorporated by reference in their entirety.

BACKGROUND

Related Field

The invention relates to a method of making a steel Yankee cylinder by welding a cylindrical shell to two end walls.

Description of Related Art

In the production of paper, drying cylinders are used on which wet fibrous webs are dried by heat that causes the water in the fibrous web to evaporate. Paper machines for making tissue paper (e.g. kitchen, towel or toilet paper) normally have only one drying cylinder which is referred to as a "Yankee" cylinder and which usually has a larger diameter than drying cylinders used in such machines that are intended for other paper grades (e.g. newsprint, printing paper or paperboard). The Yankee cylinder is usually made in cast iron but it has also been suggested that the Yankee cylinder be manufactured by other methods. U.S. Pat. No. 4,320,582 discloses how an outer shell may be formed of steel plates butt-welded to form a cylindrical weldment and rings of forged steel butt-welded to the weldment at its ends. The rings have flanges to which heads are bolted. WO 2008/105005 discloses a steel-made Yankee cylinder which has a cylindrical shell and two ends that have been welded to the cylinder by a circumferential weld that includes a weld bead on the outside of the Yankee cylinder and a weld bead on the inside of the Yankee cylinder.

Since a drying cylinder such as a Yankee cylinder is to be filled with hot steam, it must meet the requirements of a pressure vessel. In practice that means that high demands are made on the quality of the weld. To achieve this, welding is performed both from the inside of the Yankee cylinder and from the outside. However, welding from the inside is problematic since the temperature may reach very high levels and the welder must work under very pressing conditions. Gas must be evacuated during the welding operation and fresh air must be supplied. Even with good ventilation, the working conditions for the welder will be very demanding and possibly hazardous.

Therefore, it is an object of the present invention to provide a method of making a Steel Yankee cylinder which is less demanding for the operator that performs the welding and which either eliminates or reduces the requirement for ventilation during the welding operation.

BRIEF SUMMARY

According to the invention, a steel Yankee cylinder is made by welding a cylindrical shell to two end walls such that the cylindrical shell and the end walls together form the Yankee cylinder. Each end wall is welded to the cylindrical shell by a circumferential weld between opposing surfaces of each end wall and the cylindrical shell respectively. According to the invention, the welding operation is carried out exclusively from the outside of the Yankee cylinder. Moreover, the welding operation is carried out as a butt welding operation in which a backing material is used on the inside of the Yankee cylinder such that, between each end wall and the cylindrical shell, a single weld bead is formed. The single weld bead that is formed extends all the way between the opposing surfaces and completely fuses the opposing surfaces of each end wall and the cylindrical shell respectively.

DETAILED DESCRIPTION OF VARIOUS EMBODIMENTS

Figure 1:
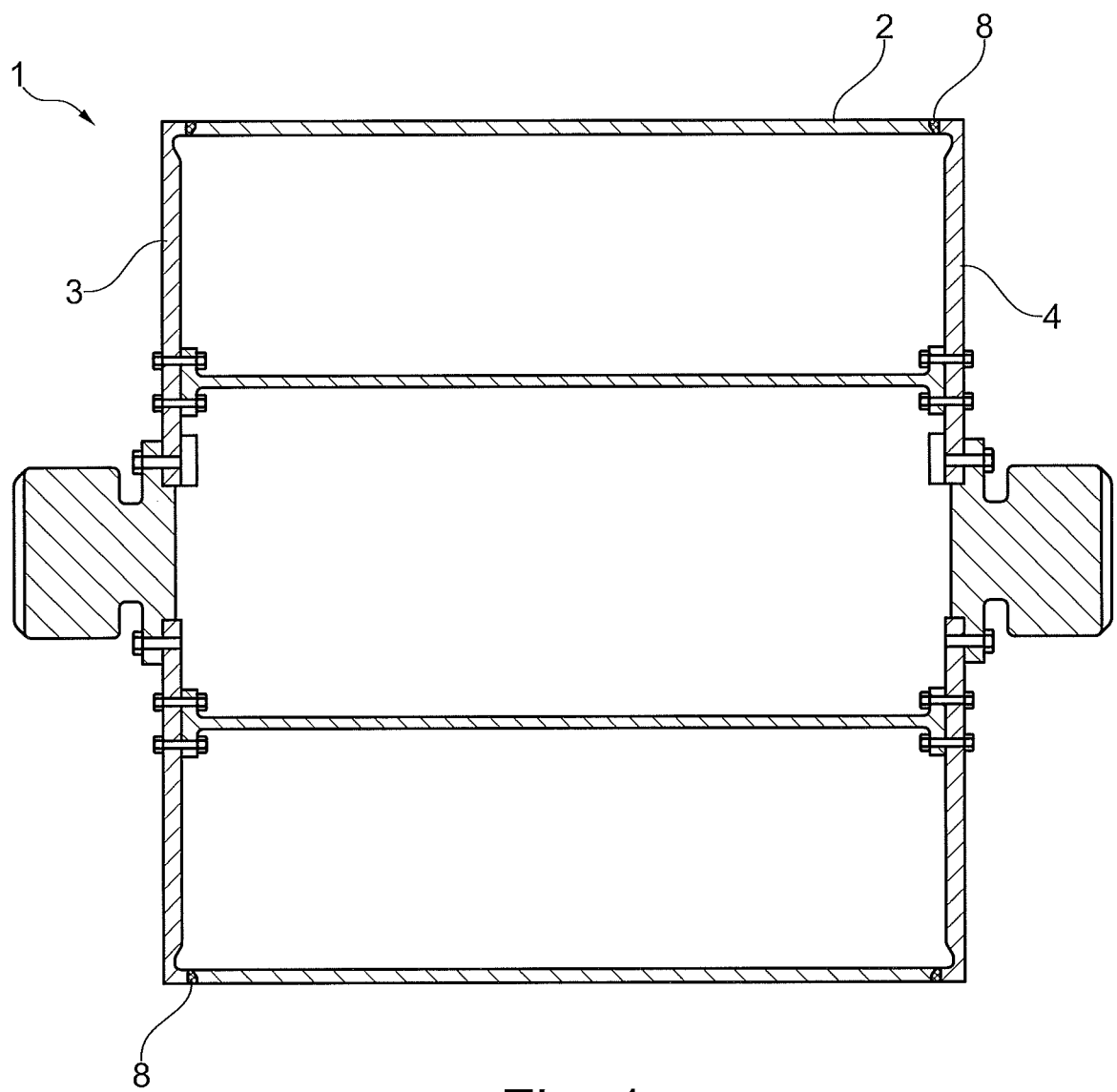
FIG. 1 shows a longitudinal cross section of a Yankee drying cylinder.

With reference to FIG. 1, a steel Yankee 1 comprises a cylindrical shell 2 to which two end walls 3, 4 have been welded such that the cylindrical shell 2 is connected to each end wall by a weld bead 8.

Figure 2:
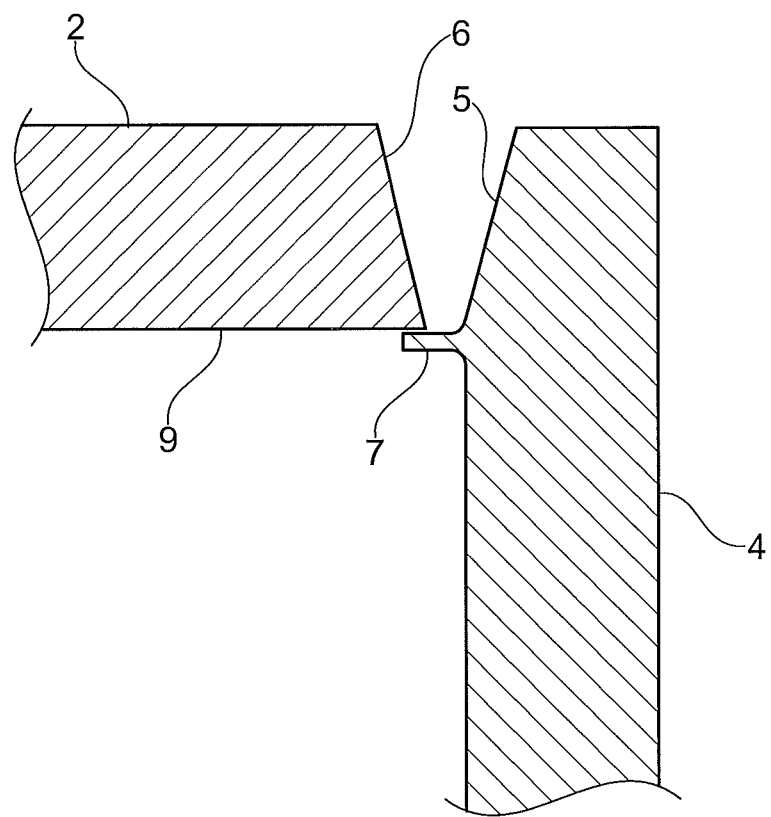
FIG. 2 shows schematically and in greater detail, a cross section of an area where an end wall is to be welded to a cylindrical shell.

FIG. 2 is a cross-sectional schematic representation of a part of the cylindrical shell 2 and an end wall 4 before the end wall 4 and the cylindrical shell 2 have been welded to each other. As can be seen in FIG. 2, a surface 6 on the cylindrical shell 2 is placed opposing a surface 5 on an end wall 4. When the opposing surfaces 5, 6 of the cylindrical shell 2 and the end walls 3, 4 are joined by a weld bead 8, the cylindrical shell 2 and the end walls 3, 4 will form together a Yankee cylinder. As can also be seen in FIG. 2, a lip protrudes from the end wall 4 such that the lip can extend below the inner surface 9 of the cylindrical shell 2. The lip can form a backing material 7 which can be used during the welding operation as will be explained in the following. It should be understood that the lip that forms a backing material 7 is ring-shaped such that can follow the inner periphery of the cylindrical shell 2.

Figure 3:
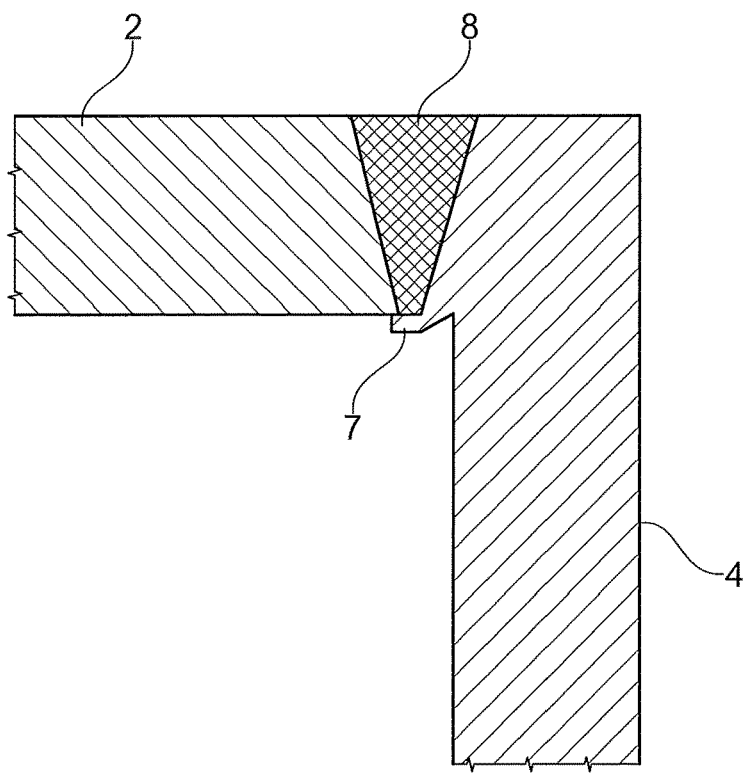
FIG. 3 shows a view similar to FIG. 2 where a weld bead has been made according to one embodiment of the invention.

With reference to FIG. 3, the inventive method comprises welding the cylindrical shell 2 to the two end walls 3, 4 such that the cylindrical shell 2 and the end walls 3, 4 together form the Yankee cylinder 1. While FIG. 3 only shows the end wall 4 on one side, it should be understood that welding of the other end wall 3 to the cylindrical shell 2 takes place in the same way. Each end wall 3, 4 is welded to the cylindrical shell 2 by a circumferential weld between the opposing surfaces 5, 6 of each end wall 3, 4 and the cylindrical shell 2 respectively. According to the invention, the welding operation is carried out exclusively from the outside of the Yankee cylinder 1 and the welding operation is carried out as a butt welding operation in which a backing material 7 is used on the inside of the Yankee cylinder 1. The welding acts on the entire area between the opposing surfaces 5, 6 of each end wall 3, 4 and the cylindrical shell 2 and filler material and molten material penetrates through the whole area such that the weld bead 8 that is formed extends all the way between the opposing surfaces 5, 6. Instead of an outer weld bead and an inner weld bead, there is a single weld bead 8 that completely fuses the opposing surfaces 5, 6 of each end wall 3, 4 and the cylindrical shell 2 respectively. The backing material 7 keeps filler material and molten material from the cylindrical shell 2 and the end walls 3, 4 in place and prevents such material from leaving the area where the weld bead 8 is formed.

In the embodiment shown in FIG. 3, the backing material 7 is formed by a lip that protrudes from an end wall 3, 4 and extends into the area on the inside of the cylindrical shell 2. However, with reference to FIG. 4, the backing material 7 may instead be formed by a lip that protrudes from each axial end of the cylindrical shell 2 and extends into an area radially inside of the opposing end wall 3, 4.

Figure 5:
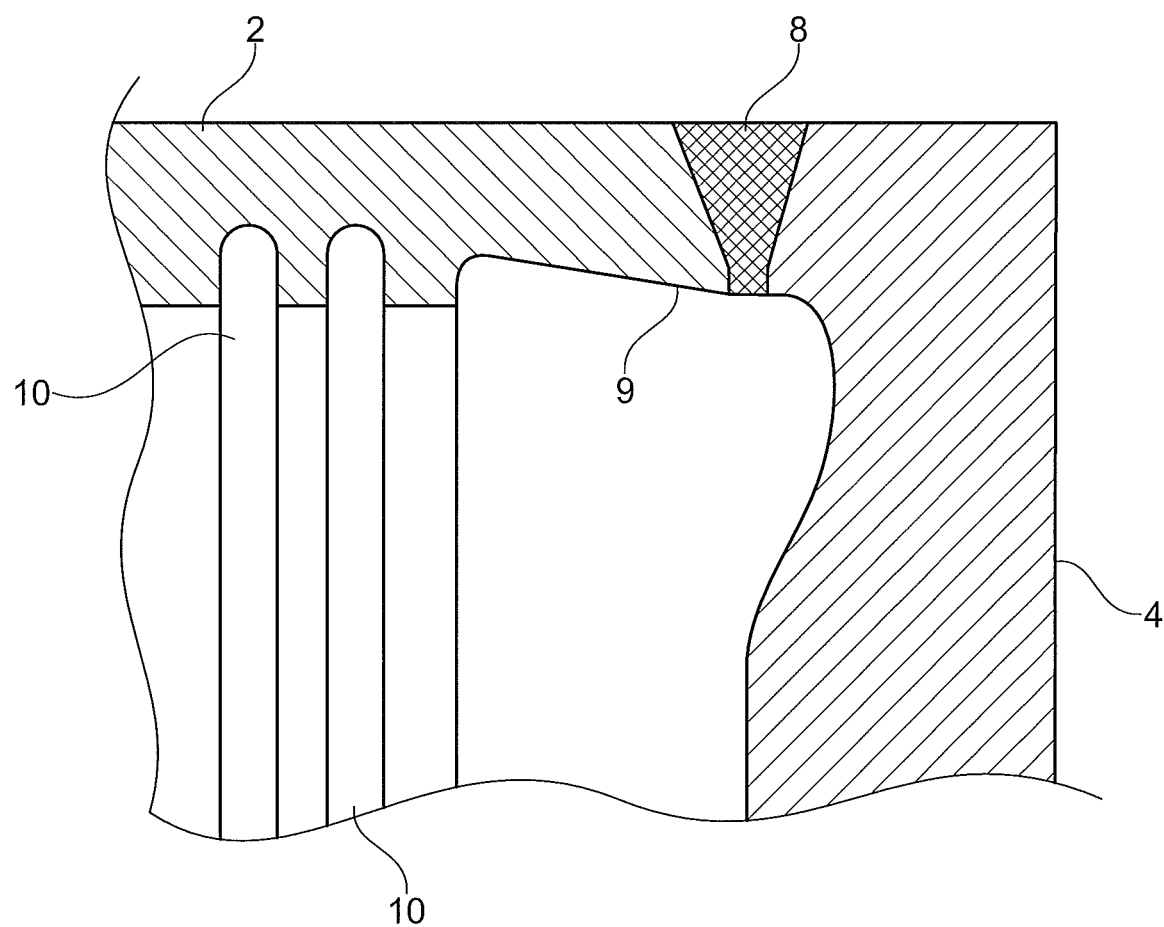
FIG. 5 is a cross sectional view of a finished welded joint which has been ground.

When the welding operation has been completed, the backing material 7 can be removed by grinding. Preferably, the single weld bead 8 which has been formed between each end wall 3, 4 and the cylindrical shell 2 is subjected to grinding on both the outside and the inside of the Yankee cylinder 1. After grinding, a cross section of the welded joint may look like in FIG. 5. FIG. 5 also shows how the cylindrical shell 2 may have circumferential grooves 10 separated by circumferential flanges 11 for heat transfer. During operation of the Yankee cylinder 1, the circumferential flanges 11 serve to improve heat transfer to the outer surface of the Yankee cylinder 1 and condensate will be received in the grooves 10. As can be seen in FIG. 5, the thickness of the wall of the cylindrical shell 2 may increase in a direction towards the area of the weld bead 8.

It should be understood that the backing material 7 need not necessarily be integral with the cylindrical shell 2 or the end walls 3, 4. Instead, the backing material 7 could be a separate element.

Figure 4:
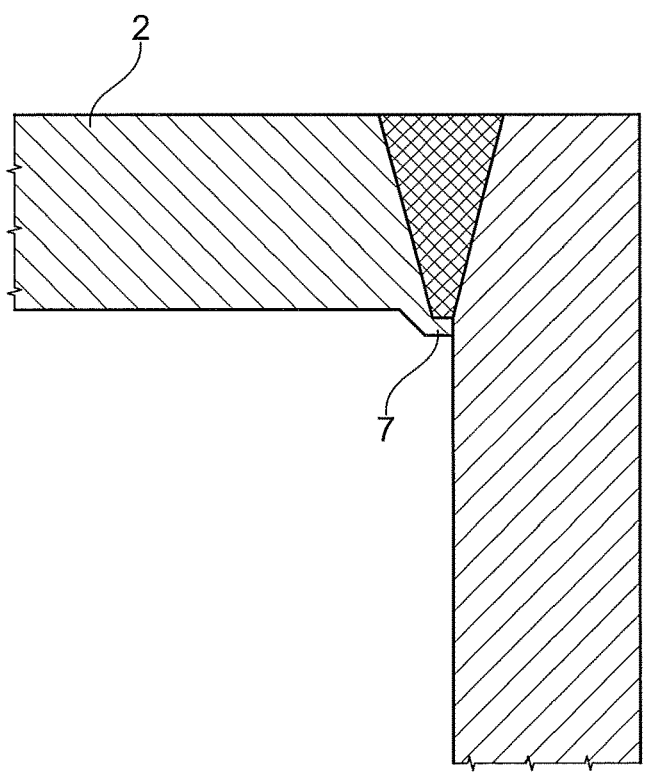
FIG. 4 is a view similar to FIG. 3 but in which the weld bead has been made according to another embodiment of the invention.

The butt welding may be carried out a s a single V butt welding operation as indicated in FIG. 2, FIG. 3 and FIG. 4 but it could also be carried out as a single U butt welding operation. It should be understood that, in this context, the terms "single V and "single U" refer to the shape of the opposing surfaces 5, 6. In FIGS. 2, 3 and 4, the opposing surfaces 5, 6 form a "V".

The welding method used can be arc welding, for example manual metal arc welding (MMA), shielded metal arc welding (SMAW) or gas metal arc welding (GMAW).

Thanks to the invention, a steel Yankee drying cylinder can be manufactured in a way that reduces the need for ventilation during the welding. Since only a single weld bead is made, production of the Yankee drying cylinder also becomes faster and easier.

The invention claimed is:

1. A method of making a steel Yankee cylinder (1) by welding a cylindrical shell (2) to two end walls (3, 4) such that the cylindrical shell (2) and the end walls (3,4) together form the Yankee cylinder (1), wherein each end wall (3,4) is welded to the cylindrical shell (2) by a single circumferential weld between opposing surfaces (5, 6) of each end wall and the cylindrical shell (2) respectively, wherein the welding operation is carried out exclusively from an outside of the Yankee cylinder (1), wherein the welding operation is carried out as a butt welding operation in which a backing material (7) is used on an inside of the Yankee cylinder (1) such that, between each end wall (3, 4) and the cylindrical shell (2), a single weld bead (8) is formed which extends all the way between the opposing surfaces (5, 6) and completely fuses the opposing surfaces (5, 6) of each end wall (3, 4) and the cylindrical shell (2), respectively, wherein the backing material (7) is defined by a lip that protrudes from each axial end of the cylindrical shell (2) and extends into an area radially inside of each of the end walls (3, 4), and wherein the weld bead (8) further extends to an external circumferential surface of the lip, such that a portion of the weld bead (8) is located axially closer to a center of the Yankee cylinder (1) than an inner surface (9) of the cylindrical shell (2).

2. The method according to claim 1, wherein the butt welding is carried out as at least one of a single V butt welding operation or a single U butt welding operation.

3. The method according to claim 1, wherein the single weld bead (8) formed between each end wall (3, 4) and the cylindrical shell (2) is subjected to grinding on both the outside and the inside of the Yankee cylinder (1).

4. The method according to claim 1, wherein the welding method used is arc welding.

5. A steel Yankee cylinder (1) comprising:
 a cylindrical shell (2) having an inner surface (9), an angled surface (6), and a lip (7) protruding from the angled surface (6); and
 two end walls (3, 4) each having an angled surface (5) welded, via a single circumferential weld bead (8), to the lip (7) and the angled surface (6) of the cylindrical shell (2),
 wherein:
  the single weld bead (8) is carried out exclusively as a butt-welding operation from an outside of the Yankee cylinder (1);
  the single weld bead (8) extends all the way between the angled surfaces (5, 6) to completely fuse the surfaces (5, 6) of each end wall (3, 4) and the cylindrical shell (2);
  the lip (7) extends into an area radially inside of each of the two end walls (3, 4) and beyond the angled surface (6); and
  the single weld bead (8) further extends to an external circumferential surface of the lip (7), such that a portion of the weld bead (8) is located axially closer to a center of the Yankee cylinder (1) than the inner surface (9) of the cylindrical shell (2).

6. The Yankee cylinder according to claim 5, wherein the single weld bead (8) formed between each end wall (3, 4) and the cylindrical shell (2) is subjected to grinding on at least the outside of the Yankee cylinder (1).

7. A method of making a steel Yankee cylinder (1) by welding a cylindrical shell (2) to two end walls (3, 4) such that the cylindrical shell (2) and the end walls (3,4) together form the Yankee cylinder (1), wherein each end wall (3,4) is welded to the cylindrical shell (2) by a single circumferential weld between opposing surfaces (5, 6) of each end wall and the cylindrical shell (2) respectively, wherein the welding operation is carried out exclusively from an outside of the Yankee cylinder (1), wherein the welding operation is carried out as a butt welding operation in which a backing material (7) is used on an inside of the Yankee cylinder (1) such that, between each end wall (3, 4) and the cylindrical shell (2), a single weld bead (8) is formed which extends all the way between the opposing surfaces (5, 6 and completely fuses the opposing surfaces (5, 6) of each end wall (3, 4) and the cylindrical shell (2), respectively, wherein the backing material (7) is defined by a lip that protrudes from each end wall (3, 4) and extends into an area on the inside of the cylindrical shell (2), and wherein an external circumferential surface of the lip is axially spaced a distance apart from an inner surface (9) of the cylindrical shell (2) to form a gap between the inner surface (9) and the lip, into which gap the single weld bead (8) extends.

8. The method according to claim 7, wherein the butt welding is carried out as at least one of a single V butt welding operation or a single U butt welding operation.

9. The method according to claim 7, wherein the single weld bead (8) formed between each end wall (3, 4) and the cylindrical shell (2) is subjected to grinding on both the outside and the inside of the Yankee cylinder (1).

10. The method according to claim 7, wherein the welding method used is arc welding.

11. A steel Yankee cylinder (1) comprising:
two end walls (3, 4) each having an angled surface (5) and a lip (7) protruding from the angled surface (5);
a cylindrical shell (2) having an inner surface (9) and an angled surface (6) welded, via a single circumferential weld bead (8), to the lip (7) and the angled surface (5) of each of the two end walls (3, 4), wherein:
the single weld bead (8) is carried out exclusively as a butt-welding operation from an outside of the Yankee cylinder (1);
the single weld bead (8) extends all the way between the angled surfaces (5, 6) to completely fuse the surfaces (5, 6) of each end wall (3, 4) and the cylindrical shell (2);
the lip (7) extends into an area radially inside of each of the two end walls (3, 4), beyond the angled surface (5), and adjacent the inner surface (9) of the cylindrical shell (2); and
an external circumferential surface of the lip (7) is axially spaced a distance apart from the inner surface (9) of the cylindrical shell (2) to form a gap between the inner surface (9) and the lip, into which gap the single weld bead (8) further extends.

12. The Yankee cylinder according to claim 11, wherein the single weld bead (8) formed between each end wall (3, 4) and the cylindrical shell (2) is subjected to grinding on at least the outside of the Yankee cylinder (1).

* * * * *